United States Patent

Itoh et al.

[11] Patent Number: 5,811,033
[45] Date of Patent: Sep. 22, 1998

[54] METHOD OF MANUFACTURING ZINC OXIDE SINTERED COMPACT BODY

[75] Inventors: Masahiro Itoh; Atsushi Iga; Hideyuki Okinaka, all of Osaka, Japan

[73] Assignee: Matsushita Electric Industrial Co., Ltd., Osaka, Japan

[21] Appl. No.: 649,880

[22] Filed: May 13, 1996

Related U.S. Application Data

[63] Continuation of Ser. No. 513,543, Aug. 10, 1995, Pat. No. 5,569,414.

[30] Foreign Application Priority Data

Aug. 29, 1994 [JP] Japan .................................. 6-203988

[51] Int. Cl.$^6$ ...................................................... H01B 1/08
[52] U.S. Cl. .............................. 252/519.51; 252/519.54; 423/622
[58] Field of Search ..................................... 252/518, 519, 252/520, 521, 519.51, 519.54, 519.1; 423/622; 427/101; 75/252; 419/54, 65

[56] References Cited

U.S. PATENT DOCUMENTS

| | | | |
|---|---|---|---|
| 4,186,367 | 1/1980 | Chakrabarty et al. | 338/21 |
| 4,477,793 | 10/1984 | Makae et al. | 252/518 |
| 4,551,268 | 11/1985 | Eda et al. | 252/518 |
| 4,959,262 | 9/1990 | Charles et al. | 428/329 |
| 5,039,971 | 8/1991 | Imai et al. | 252/518 |
| 5,277,843 | 1/1994 | Imai et al. | 252/518 |

FOREIGN PATENT DOCUMENTS

| | | | |
|---|---|---|---|
| 0 594 120 A2 | 4/1994 | European Pat. Off. | H01C 7/10 |
| 81 01079 | 1/1981 | France | H01C 7/00 |
| 57-169203 | 10/1982 | Japan . | |
| 3-142802 | 6/1991 | Japan . | |
| 4-139702 | 5/1992 | Japan . | |

*Primary Examiner*—Mark Kopec
*Attorney, Agent, or Firm*—Merchant, Gould, Smith, Edell, Welter & Schmidt, P.A.

[57] ABSTRACT

By performing a debinder process before or at the time of firing, and by enhancing a programming rate in the temperature range of 650°~950° C., the size of particles shows less distribution. Also, when the temperature comprising the particle growth range of 1025°~1200° C. is maintained for many hours, a zinc oxide varistor having relatively large and uniformly formed particles can be provided. When a zinc oxide varistor compound is fired, a solid solution of zinc oxide spinel is fired at the programming rate of 175° to 500° C./hr in the temperature range comprising the primary phase of from 650° to 950° C., and at the programming rate of 30° to 500° C./hr in the range of from 1250° to 1300° C. Accordingly, a zinc oxide varistor having comparatively large and uniformed formed particles can be obtained. Sintered products obtained in this way show less distribution in operating voltage.

8 Claims, 2 Drawing Sheets

METHOD OF MANUFACTURING ZINC OXIDE SINTERED COMPACT BODY

This is a continuation of application Ser. No. 08/513,543, filed Aug. 10, 1995, which application(s) are incorporated herein by reference now U.S. Pat. No. 5,569,414.

FIELD OF THE INVENTION

This invention relates to a method of manufacturing a zinc oxide sintered compact body used in a zinc oxide varistor, which is applied for removing induction noise of lightning, noise of electric source arising in various electric and electronic appliances, noise of steep pulse, or surge.

BACKGROUND OF THE INVENTION

Recently, a zinc oxide varistor has been used more and more in order to assure the safety and operating stability of electronic and electric appliances against, for example, various surge or pulse noise or induced lightning, and also to cope with reinforcement of various noise regulations. A conventional zinc oxide varistor will now be explained. The operating voltage of a zinc oxide varistor is the voltage at the time when 1 mA of electric current runs in the varistor. Depending on the types of circuits electronic and electric appliances have, the operating voltage ranges from several tens of V to several tens of thousand V. However, the operating voltage is basically determined by the number of particles present between electrodes, and it is known that the operating voltage per one particle is about 3 V. Except for high voltage products with high operating voltage, low voltage products have a fixed thickness, so that the operating voltage is dependent upon the diameter of particles, that is, the number of particles.

When ceramics are sintered, the density starts to increase in the initial stage without so much accompanying growth of particles. As soon as the increase stops, growth of particles, called a secondary recrystallization particle growth, will then take place. This process often creates abnormally large particles, which is called an abnormal particle growth, that causes distribution in operating voltage. Therefore, a product with operating voltage of 100 V and higher, which may have small particles, had around 33 particles and more in the 1 mm thickness. Statistically, this product comprised a proper mixture of large particles and small particles, and distribution in operating voltage did not become so large as to interfere with production. In the case of a low voltage product of 100 V and lower, it was necessary to allow particles to grow. Therefore, it was common to slow down the programming rate and to fire for many hours.

For the purpose of securing reliability, and also by estimating drifting during the firing, a zinc oxide varistor is provided with a large amount of oxide or carbonate to excess, so that additive elements are sufficiently present inside the particles and in the particle field. When the additives are fired, one of the compounds which can be present in the end is a solid solution of zinc oxide spinel, and these compounds which are present in the particle field affect the distribution in the diameter of particle. Furthermore, the increase of programming rate at the time of the debinder process (0° to 650° C.) can lead to various reliability deteriorations, for example, distribution in operating voltage and leakage current may increase because the debinder process is insufficiently performed and carbon remains. In addition, a rapid decomposition of binder can cause, for example, cracks in products, so that this method was not suitable as a manufacturing method in the industry.

However, in the conventional method mentioned above, giant particles of 100 μm and larger which are trying to grow abnormally and smaller particles with insufficient particle growth are coexisting, and a large number of particles with about 20 μm are also present. As a result, distribution in operating voltage were large, and it was difficult to attain the product specification of ±10% in operating voltage. Also, its low yield of around 50% was a big cost problem. Since additives which produce the solid solution of zinc spinel are present in the particle field in the form of microparticles, they prevent particles from growing, thereby causing distribution. Therefore, it is considered appropriate to control the amount of additives. However, it is necessary to add the additives to excess in order to secure reliability and to attain stable quality.

SUMMARY OF THE INVENTION

It is an object of this invention to solve the above-mentioned problems in the conventional system by providing a method of manufacturing a zinc oxide sintered compact body for obtaining a high-quality varistor with low cost by allowing particles to grow uniformly and also by securing stable reliability.

In order to accomplish these and other objects and advantages, a method of manufacturing a zinc oxide sintered compact body comprises the step of firing a zinc oxide varistor composition at least containing zinc oxide at 78 mol% or more, magnesium oxide at 0 to 20 mol%, bismuth oxide at 0.1 to 2 mol%, $TiO_2$ at 0.1 to 2 mol%, and antimony oxide (as $Sb_2O_3$) at 0.01 to 0.5 mol%, wherein the zinc oxide varistor composition is fired at the programming rate of 175° to 500° C./hr in the temperature range of from 650° to 950° C. comprising a primary phase temperature range of a solid solution of zinc oxide spinel, and at the programming rate of 30° to 500° C./hr in the range of from 950° to 1300° C.

In the above-mentioned method, it is preferable that the zinc oxide varistor composition is provided with cobalt oxide (as CoO) at 0 to 3 mol%, nickel oxide at 0 to 3 mol%, manganese oxide (as MnO) at 0 to 3 mol%, magnesium oxide at 0 to 20 mol%, chromium oxide ($Cr_2O_3$) at 0 to 0.5 mol%, tin oxide ($SnO_2$) at 0 to 0.5 mol%, and one substance at least containing aluminium or gallium which forms an oxide during the burning process at 0 to 50 ppm mol%, for forming a solid solution of zinc oxide spinel essentially having the following formula (Formula 1).

(Formula 1)

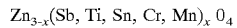

$$Zn_{3-x}(Sb, Ti, Sn, Cr, Mn)_x O_4$$

The reason why the solid solution of zinc oxide spinel can be shown only essentially as Formula 1 is that the spinel phase, being analyzed by the XMA analysis, was dissolved as a solid body in various atoms and showed a large distribution of atoms contained, so that it was not possible to recite the precise formula.

Furthermore, it is preferable that the firing temperature of zinc oxide ranging from 1025° to 1200° C. is maintained for 2 minutes to 100 hours.

In addition, it is preferable that the burning process takes place after adding a binder at 2 to 10 weight % and press-molding.

Also, it is preferable that the burning process takes place after adding a binder at 10 to 50 weight %, and forming a thin film by a dicoater method or a doctor blade method.

It is preferable that the film formed by a dicoater method or a doctor blade method is formed into a laminated chip before being fired.

Furthermore, it is preferable that prior to performing the main firing in the primary phase temperature range, a debinder process is performed in advance at 350° to 650° C. and also in an oxygen-containing atmosphere, and then the main firing takes place after the atmosphere is changed or in a separate furnace.

In addition, it is preferable that at the time when the main firing in the range of primary phase temperature is performed, a debinder process is performed in advance at 350° to 650° C. and in an oxygen-containing atmosphere.

Also, it is preferable that at least two types of oxide selected from the group consisting of cobalt oxide, manganese oxide, and nickel oxide are added.

It is preferable that Cr oxide and Sb oxide are each added at an amount of more than 0.01 mol%.

Another invention is an zinc oxide varistor manufactured by the above-mentioned method.

According to the above-mentioned configuration of this invention, by controlling the production of zinc spinel solid solution as much as possible, a uniform growth of particles can be accomplished. In particular, the programming rate is enhanced in the range of 650° to 950° C., which is a primary crystal temperature range of a zinc spinel solid solution, for allowing particles to grow uniformly. For further attaining uniform growth of particles, the temperature ranging from 1025° to 1200° C. is maintained for many hours, thereby obtaining good results. In addition, when the debinder process takes place at the temperature of 650° C. and lower, it is possible to obtain a zinc oxide sintered compact body having even more uniformly formed particles.

The above-mentioned measures enable the reduction of distribution in the operating voltage of the zinc oxide sintered compact body. To be more precise, zinc oxide particles start firing at about 700° C. in the presence of bismuth oxide, and the particles begin to grow around 1025° C. When other additives are not included, the particles grow mostly to the same size. However, by adding various additives for securing reliability, these additive create compounds which exist in the particle field and interfere with the particle growth. The composition of this invention consists mainly of zinc oxide particles, and the particle field includes a zinc oxide spinel solid solution and a mixture mainly of the bismuth oxide-titanium oxide-zinc oxide type. In this case, by enhancing the programming rate in the range of 650° to 950° C., which is a primary crystal temperature range of a zinc oxide spinel solid solution, production of the zinc oxide spinel solid solution is restrained. In this way, the growth of zinc oxide particles is facilitated. At the temperature of 1025° C. and higher, a liquid phase mainly composed of bismuth oxide-titanium oxide-zinc oxide produced in a large amount becomes dominant, and the production of zinc oxide spinel solid solution is restrained gradually, so that the influence on the particles is not particularly large.

Next, influence of the debinder process will be explained. An organic binder is used commonly for manufacturing ceramic compounds. During mass production, a large amount of products are processed, so that air diffusion is insufficient inside the products versus the surface. This can cause a small amount of carbon to remain in a non-uniform condition. In this case, not only can the reliability deterioration arise due to oxygen deficiency, but also the growth of particles can be restrained to cause distribution in operating voltage. Finally, when an appropriate amount of solid solution of zinc oxide spinel is present, by maintaining the temperature in the range of 1025° to 1200° C. for many hours, the boundary energy of particles can become naturally uniform and the uniformly formed particles cause less distribution in operating voltage.

BRIEF DESCRIPTION OF THE DRAWINGS

FIG. 1 (b) is a traced drawing of a SEM photo (magnification:about 100 times) showing a conventional firing method (smaller particles are larger in number).

DETAILED DESCRIPTION OF THE INVENTION

Figure 1A:
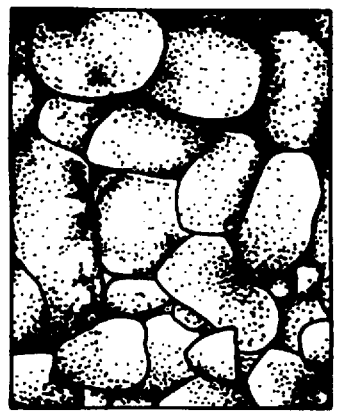
FIG. 1 (a) is a traced drawing of a SEM photo (magnification:about 100 times) showing a third firing method in Example 1 of this invention.

This invention will be described in detail by referring to the following examples and attached figures. The examples are illustrative and should not be construed as limiting the invention in any way.

EXAMPLE 1

First, the following oxides were mixed:zinc oxide at 96 mol%, oxide which mainly forms a solid solution of zinc oxide spinel, other than titanium oxide and manganese oxide, at 0.5 mol% (Chromium oxide, antimony oxide, and tin oxide were added. Here, chromium oxide and tin oxide are not indispensable since their influence is limited to slight deterioration in a nonlinear coefficient:α or in pulse characteristics), titanium oxide, bismuth oxide, and manganese oxide totaling to 1.5 mol%; and nickel oxide and cobalt oxide totaling to 2 mol%. Then, aluminum nitrate was added at 10 ppm mol% (ppm=$10^{-6}$), and polyvinyl butyral 10 weight % liquid which was dissolved with a solvent such as butyl acetate was added as a binder at a weight ratio of 35%. This substance was mixed in a ball mill for 20 hours, and then formed into a thin film using a doctor blade method or a dicoater method. Thereafter, the film was laminated and fired at 1300° C. for 2 hours, thereby attaining a thickness of 1 mm.

Distribution in operating voltage were as follows:

(1) Conventional firing method

Firing temperature:0°~1300° C.; programming rate:100° C./hr; after 2 hours of firing at 1300° C., operating voltage and distribution:(3 sigma) 60±12V (here, voltage of 1 mA running in a varistor); process yield:50% (product standard ±10%; Fluctuation in the process thereafter is included, which also affects the yield as to be discussed hereinafter. Here, by attaching importance to characteristics and reliability, the firing temperature and time were maintained for 2 hours at the highest temperature of each embodiment in the conventional firing method and the firing method of this invention. However, this procedure was omitted in the following examples).

Furthermore, regardless of whether a debinder process was performed or not, a significant difference was not observed in the conventional examples. On the other hand, the examples of the invention attained more preferable results with a debinder process.

(2) Firing method 1 in the example of the invention

No debinder process performed; programming rate from 0°~650° C. :100° C./hr; programming rate from 650°~950° C.:300° C./hr; programming rate from 950°~1300° C.:100° C./hr; operating voltage and distribution:(3 sigma) 45±4.8V; process yield:88% (product standard ±10%).

(3) Firing method 2 in the example of the invention

No debinder process performed; programming rate from 0~650° C. :100° C./hr; programming rate from 650°~950° C.:300° C./hr; programming rate from 950°~130° C.:100°

C./hr; maintained at 1025° C. for 5 hours; operating voltage and distribution:(3 sigma) 43±4.5 V; process yield:92% (product standard ±10%).

(4) Firing method 3 in the example of the invention

No debinder process performed; programming rate from 0°~650° C. :100° C./hr; programming rate from 650°~950° C.:300° C./hr; programming rate from 950°~1300° C.:500° C./hr; operating voltage and distribution:(3 sigma) 45±5.0 V; process yield:86% (product standard ±10%).

(5) Firing method 4 in the example of the invention

No debinder process performed; programming rate from 0°~650° C. :100° C./hr; programming rate from 650~950° C.:300° C./hr; programming rate from 950°~1300° C.:500° C./hr; maintained at 1000° C. for 5 hours; operating voltage and distribution:(3 sigma) 43±4.7 V; process yield:90% (product standard ±10%).

(6) Firing method 5 in the example of the invention

No debinder process performed; programming rate from 0°~650° C. :100° C./hr; programming rate from 650°~950° C.:300° C./hr; programming rate from 950°~1300° C.:30° C./hr; operating voltage and distribution:(3 sigma) 44±5.2 V; process yield:86% (product standard ±10%).

(7) Firing method 6 in the example of the invention

No debinder process performed; programming rate from 0°~650° C. :100° C./hr; programming rate from 650°~950° C.:300° C./hr; programming rate from 950°~1300° C.:30° C./hr; maintained at 1000° C. for 5 hours; operating voltage and distribution:(3 sigma) 42±5.1 V; process yield:85% (product standard ±10%).

(8) Firing method 7 in the example of the invention

Debinder process performed; programming rate from 0°~650° C. 100° C./hr; maintained at 450° C. for 1 hour; programming rate from 650°~950° C.:300° C./hr; programming rate from 950°~1300° C.:100° C./hr; operating voltage and distribution:(3 sigma) 45±3.1 V; process yield:100% (product standard ±10%).

(9) Firing method 8 in the example of the invention

Debinder process. performed; programming rate from 0°~650° C.: 100° C./hr; maintained at 450° C. for 1hour; programming rate from 650°~950° C.:300° C./hr; programming rate from 950°~1300° C.:100° C. /hr; maintained at 1025° C. for 5 hours; operating voltage and distribution:(3 sigma) 42±2.8 V; process yield:100% (product standard ±10%).

(10) Firing method 9 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:500° C. /hr; operating voltage and distribution:(3 sigma) 45±3.3 V; process yield:100% (product standard ±10%).

(11) Firing method 10 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:500° C. /hr; maintained at 1100° C. for 5 hours; operating voltage and distribution:(3 sigma) 42±3.1 V; process yield:100% (product standard ±10%).

(12) Firing method 11 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:30° C./hr; operating voltage and distribution:(3 sigma) 45±3.1 V; process yield:100% (product standard ±10%).

(13) Firing method 12 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:30° C./hr; maintained at 1150° C. for 5 hours; operating voltage and distribution:(3 sigma) 42±2.9 V; process yield:100% (product standard ±10%).

Furthermore, distribution in surge characteristics at short wave pulse of 2500 A were reduced to ⅔, and the same effects were also confirmed in the examples to be mentioned hereinafter.

When aluminium or gallium was added at more than 50 ppm, leakage current increased, so that the product was no longer useful. It was not preferable to add cobalt oxide or manganese oxide or nickel oxide which is mainly soluble in zinc oxide as a solid body at more than 3 mol% was not preferable since reliability, for example, pulse characteristics, deteriorated. Also, from the viewpoint of leakage current, it was advantageous to add at least two oxide types among cobalt oxide, manganese oxide, and nickel oxide. When Cr oxide or Sb oxide forming the solid solution of zinc oxide spinel was each present at 0.01 mol% or less, the leakage current increased, and the increase of leakage current was also observed when Sn oxide was added at 0.03 mol% or less. In addition, when more than 0.5 mol% was present, the particles became so small that it was not effective to reduce distribution in operating voltage as in the examples. As for the above-mentioned additives, the same results were also obtained in other examples. When bismuth oxide or titanium oxide was added at 0.1 mol% or less, the number of microparticles increased too much, so the effects were not so significant as in the examples. Also, the amount of more than 2 mol% proved to be an unpractical mixture since reliability such as pulse characteristics deteriorated or products fused together during firing.

Figure 1B:

FIGS. 1 (a) and 1 (b) are traced drawings of SEM photos (magnification:about 100 times) showing the third firing method in Example 1 of this invention and the conventional firing method. FIG. 1 (a) is a SEM photo of the third firing method of this invention, and FIG. 1 (b) is a SEM photo of the conventional firing method. The conventional method shown in FIG. 1 (b) has more smaller particles. It is clear from FIGS. 1 (a) and 1 (b) that the particles become larger when the programming rate was increased to 300° C./hr, and that less microparticles are present.

The programming rate at 30° C./hr and lower in the range of 950°~1300° C. proved to be disadvantageous to the productivity and also unsuitable as industrial conditions. The programming rate at 500° C./hr and higher proved to be unsuitable as a method of industrial production since the heater, the furnace material, and the sheath were greatly damaged. The same results were obtained also. in the examples to be mentioned hereinafter, so the programming rate in the range of 950°~1300° C. will be omitted.

EXAMPLE 2

First, the following oxides were mixed:zinc oxide at 80 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; nickel oxide and cobalt oxide totaling to 2 mol%; and magnesium oxide at 16 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

When magnesium oxide was added more than 20 mol%, pulse characteristics were so bad that the product was no longer useful.

(1) Conventional firing method

Firing temperature:0°~1300° C.; programming rate:100° C./hr; operating voltage and distribution:(3 sigma) 63±13 V (voltage of 1 mA running in a varistor); process yield:52% (product standard ±10%).

(2) Firing method 1 in the example of the invention

No debinder process performed; programming rate from 0°~650° C. :100° C./hr; programming rate from 650°~950° C.:300° C./hr; programming rate from 950°~1300° C.:100° C./hr; operating voltage and distribution:(3 sigma) 50±5.5 V; process yield:85% (product standard ±10%).

(3) Firing method 2 in the example of the invention

No debinder process performed; programming rate from 0°~650° C. :100° C./hr; programming rate from 650°~950° C.:300° C./hr; programming rate from 950°~1300° C.:100° C./hr; maintained at 1100° C. for 5 hours; operating voltage and distribution:(3 sigma) 47±5.3 V; process yield:90% (product standard ±10%).

(4) Firing method 3 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:100° C. /hr; operating voltage and distribution:(3 sigma) 48±3.2 V; process yield:100% (product standard ±10%).

(5) Firing method 4 in the example of the invention

Debinder process performed; programming rate from 0°~650° C.: 100° C./hr; maintained at 450° C. for 1 hour; programming rate from 650°~950° C.:300° C./hr; programming rate from 950°~1300° C.:100° C. /hr; maintained at 1200° C. for 1 hour; operating voltage and distribution:(3 sigma) 44±2.9 V; process yield:100% (product standard ±10%).

Figure 2:
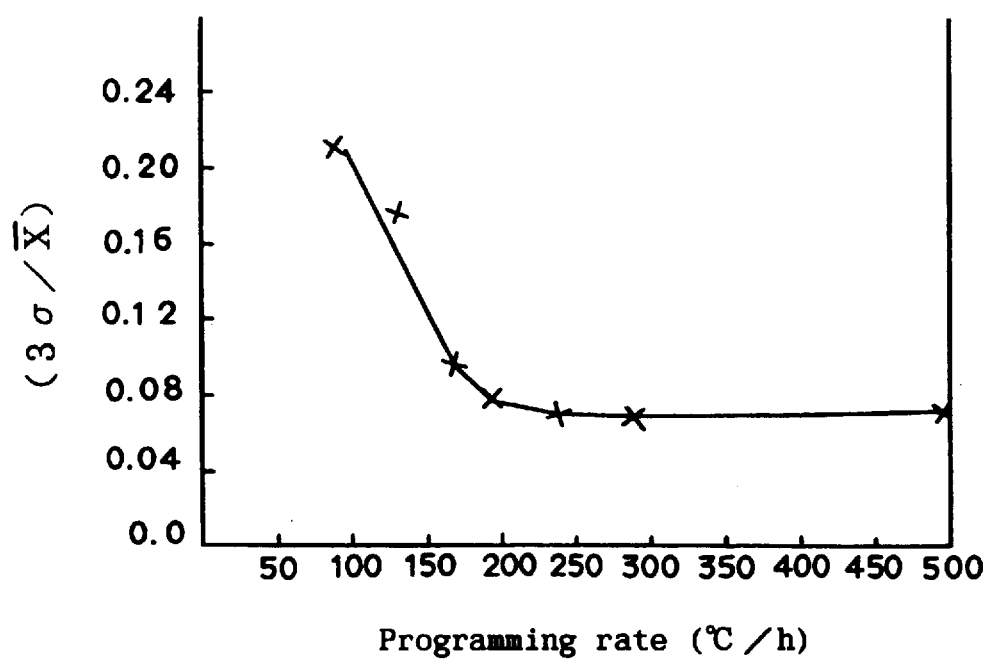
FIG. 2 is a graph showing firing speed and distribution in operating voltage in one embodiment of the firing method of this invention.

In FIG. 2, effects in distribution of operating voltage (3 sigma /average value) using the mixture of Example 2 are shown when the programming rate was changed.

EXAMPLE 3

First, the following oxides were mixed:zinc oxide at 94.5 mol%, oxide which mainly forms a solid solution of zinc oxide spinel, other than titanium oxide and manganese oxide, at 1.0 mol%, titanium oxide, bismuth oxide, and manganese oxide totaling to 1.5 mol%; nickel oxide and cobalt oxide totaling to 2 mol%; and magnesium oxide at 1 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1300° C.; programming rate:100° C./hr; operating voltage and distribution:(3 sigma) 70±13 V (voltage of 1 mA running in a varistor); process yield:55% (product standard ±10%).

(2) Firing method 1 in the example of the invention

No debinder process performed; programming rate from 0°~650° C. :100° C./hr; programming rate from 650°~950° C.:500° C./hr; programming rate from 950°~1300° C.:100° C./hr; operating voltage and distribution:(3 sigma) 48±5.4 V; process yield:87% (product standard ±10%).

(3) Firing method 2 in the example of the invention

No debinder process performed; programming rate from 0°~650° C. :100° C./hr; programming rate from 650°~950° C.:500° C./hr; programming rate from 950°~1300° C.:100° C./hr; maintained at 1100° C. for 1 hour; operating voltage and distribution:(3 sigma) 47±5.2 V; process yield:89% (product standard ±10%).

(4) Firing method 3 in the example of the invention

Debinder process performed; programming rate from 0°~650° C.: 100° C./hr; maintained at 450° C. for 1 hour; programming rate from 650°~950° C.:500° C./hr; programming rate from 950°~1300° C.:100° C. /hr; operating voltage and distribution:(3 sigma) 45±3.1 V; process yield:100% (product standard ±10%).

(5) Firing method 4 in the example of the invention

Debinder process performed; programming rate from 0°~650° C.: 100° C./hr; maintained at 450° C. for 1 hour; programming rate from 650°~950° C.:500° C./hr; programming rate from 950°~1300° C.:100° C. /hr; maintained at 1100° C. for 1 hour; operating voltage and distribution:(3 sigma) 44±2.9 V; process yield:100% (product standard ±10%).

EXAMPLE 4

First, the following oxides were mixed:zinc oxide at 96 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%, and nickel oxide and cobalt oxide totaling to 2 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :100° C./hr; programming rate from 650°~950° C.:150° C./hr; programming rate from 950°~1300° C.:100° C./hr; operating voltage and distribution:(3 sigma) 53±9.6 V; process yield:62% (product standard ±10%).

(3) Firing method 2 in the example of the invention

No debinder process performed; programming rate from 0°18 650° C. :100° C./hr; programming rate from 650°~950° C.:150° C./hr; programming rate from 950°~1300° C.:100° C./hr; maintained at 1100° C. for 1 hour; operating voltage and distribution:(3 sigma) 52±9.4 V; process yield:64% (product standard ±10%).

(4) Firing method 3 in the example of the invention

Debinder process performed; programming rate from 0°~650° C.: 100° C./hr; maintained at 450° C. for 1 hour; programming rate from 650°~950° C.:150° C./hr; programming rate from 950°~1300° C.:100° C. /hr; operating voltage and distribution:(3 sigma) 50±9.0 V; process yield:68% (product standard ±10%).

(5) Firing method 4 in the example of the invention

Debinder process performed; programming rate from 0°~650° C.: 100° C./hr; maintained at 450° C. for 1 hour; programming rate from 650°~950° C.:150° C./hr; programming rate from 950°~1300° C.:100° C. /hr; maintained at 1100° C. for 1 hour; operating voltage and distribution:(3 sigma) 49±8.9 V; process yield:69% (product standard ±10%).

Example 4 proved to be unsuitable for stable production since large distribution in operating voltage were observed.

EXAMPLE 5

First, the following oxides were mixed:zinc oxide at 96 mol%, oxide which mainly forms a solid solution of zinc oxide spinel, other than titanium oxide and manganese oxide, at 0.7 mol%, titanium oxide, bismuth oxide, and manganese oxide totaling to 1.5 mol%; and nickel oxide and cobalt oxide totaling to 1.8 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :100° C./hr; programming rate from 650°~950° C.:200° C./hr; programming rate from 950°~1300° C.:100° C./hr; operating voltage and distribution:(3 sigma) 51±5.5 V; process yield:95% (product standard ±10%).

(3) Firing method 2 in the example of the invention

No debinder process performed; programming rate from 0°~650° C. :100° C./hr; programming rate from 650°~950° C.:200° C./hr; programming rate from 950°~1300° C.:100° C./hr; maintained at 1200° C. for 1 hour; operating voltage and distribution:(3 sigma) 49±5.2 V; process yield:97% (product standard ±10%).

(4) Firing method 3 in the example of the invention

Debinder process performed; programming rate from 0°~650° C.: 100° C./hr; maintained at 450° C. for 1 hour; programming rate from 650°~950° C.:200° C./hr; programming rate from 950°~1300° C.:100° C. /hr; operating voltage and distribution:(3 sigma) 48±4.4 V; process yield:99% (product standard ±10%).

(5) Firing method 4 in the example of the invention

Debinder process performed; programming rate from 0°~650° C.: 100° C./hr; maintained at 450° C. for 1 hour; programming rate from 650°~950° C.:200° C./hr; programming rate from 950°~1300° C.:100° C. /hr; maintained at 1200° C. for 1 hour; operating voltage and distribution:(3 sigma) 46±4.2 V; process yield:100% (product standard ±10%).

EXAMPLE 6

First, the following oxides were mixed:zinc oxide at 92 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; and nickel oxide and cobalt oxide totaling to 6 mol%. Next, gallium nitrate was added at 10 ppm mol%, except for the case of firing method 5 in which gallium nitrate of 5 ppm and aluminum nitrate of 5 ppm were added, and then mixed in a ball mill for 20 hours and dried. Then, polyvinyl alcohol was added. The disk pressed was fired at 1300° C. for 2 hours, thereby attaining a thickness of 1 mm. Gaps in operating voltage were as follows:

(1) Conventional firing method

Firing temperature:0°~1300° C.; programming rate:100° C./hr; operating voltage and distribution:(3 sigma) 63±13 V (voltage of 1 mA running in a varistor); process yield:52% (product standard ±10%).

(2) Firing method 1 in the example of the invention

No debinder process performed; programming rate from 0°~650° C. :100° C./hr; programming rate from 650°~950° C.:200° C./hr; programming rate from 950°~1300° C.:100° C./hr; operating voltage and distribution:(3 sigma) 50±5.4 V; process yield:93% (product standard ±10%).

(3) Firing method 2 in the example of the invention

No debinder process performed; programming rate from 0°~650° C. :100° C./hr; programming rate from 650°~950° C.:200° C./hr; programming rate from 950°~1300° C.:100° C./hr; maintained at 1100° C. for 1 hour; operating voltage and distribution:(3 sigma) 48±4.9 V; process yield:95% (product standard ±10%).

(4) Firing method 3 in the example of the invention

Debinder process performed; programming rate from 0°~650° C.: 100° C./hr; maintained at 450° C. for 1 hour; programming rate from 650°~950° C.:200° C./hr; programming rate from 950°~1300° C.:100° C. /hr; operating voltage and distribution:(3 sigma) 46±4.0 V; process yield:100% (product standard ±10%).

(5) Firing method 4 in the example of the invention

Debinder process performed; programming rate from 0°~650° C.: 100° C./hr; maintained at 450° C. for 1 hour; programming rate from 650°~950° C.:200° C./hr; programming rate from 950°~1300° C.:100° C. /hr; maintained at 1100° C. for 1 hour; operating voltage and distribution:(3 sigma) 45±3.8 V; process yield:100% (product standard ±10%).

(6) Firing method 5 in the example of the invention

Debinder process performed; programming rate from 0°~650° C.: 100° C./hr; maintained at 450° C. for 1 hour; programming rate from 650°~950° C.:200° C./hr; programming rate from 950°~1300° C.:100° C. /hr; maintained at 1100° C. for 1 hour; operating voltage and distribution:(3 sigma) 47±3.7 V; process yield:100% (product standard ±10%).

As mentioned earlier, only this firing method 5 in Example 6 used a mixture consisting of aluminum nitrate 5 ppm mol% and gallium nitrate 5 ppm mol% instead of aluminum nitrate 10 ppm mol%.

Even if gallium nitrate and aluminum nitrate were mixed optionally, almost the same effects were confirmed, and this also goes for other examples. The same effects were also attained by using an organic acid such as aluminum acetate, or an aluminum metallic compound such as aluminum alkoxide, or aluminum sulfate, or aluminum hydroxide, or alumina. Dry blending showed good results with those surfacing through separation from water. Almost the same tendency was observed also with gallium, and the same effects with aluminum were obtained.

EXAMPLE 7

First, the following oxides were mixed:zinc oxide at 96 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; and nickel oxide and cobalt oxide totaling to 2 mol%. Next, gallium nitrate and aluminum nitrate were each added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1250° C.; programming rate:100° C./hr; operating voltage and distribution:(3 sigma) 62±12 V (voltage of 1 mA running in a varistor); process yield:52% (product standard ±10%)

(2) Firing method 1 in the example of the invention

No debinder process performed; programming rate from 0°~650° C. :100° C./hr; programming rate from 650°~950° C.:200° C./hr; programming rate from 950°~1250° C.:100° C./hr; operating voltage and distribution:(3 sigma) 54±5.6 V; process yield:90% (product standard ±10%).

(3) Firing method 2 in the example of the invention

No debinder process performed; programming rate from 0°~650° C. :100° C./hr; programming rate from 650°~950° C.:200° C./hr; programming rate from 950°~1250° C.:100° C./hr; maintained at 1100° C. for 1 hour; operating voltage and distribution:(3 sigma) 53±5.4 V; process yield:92% (product standard ±10%).

(4) Firing method 3 in the example of the invention

Debinder process performed; programming rate from 0°~650° C.: 100° C./hr; maintained at 450° C. for 1 hour; programming rate from 650°~950° C.:200° C./hr; programming rate from 950°~1250° C.:100° C. /hr; operating voltage and distribution:(3 sigma) 52±4.3 V; process yield:100% (product standard ±10%).

(5) Firing method 4 in the example of the invention

Debinder process performed; programming rate from 0°~650° C.: 100° C./hr; maintained at 450° C. for 1 hour; programming rate from 650°~950° C.:200° C./hr; programming rate from 950°~1250° C.:100° C. /hr; maintained at 1100° C. for 1 hour; operating voltage and distribution:(3 sigma) 50±4.1 V; process yield:99% (product standard ±10%). When maintained at 1100° C. for 5 hours, the process yield reached 100%.

Even if the firing temperature was varied in the range of 1200°~1300° C., the effect was limited to a slight rise of operating voltage along with a decrease of temperature. This was also the same with other examples.

EXAMPLE 8

First, the following oxides were mixed:zinc oxide at 96 mol%, oxide which mainly forms a solid solution of zinc oxide spinel, other than excluding titanium oxide and manganese oxide, at 0.5 mol%, titanium oxide, bismuth oxide, and manganese oxide totaling to 1.5 mol%; and nickel oxide and cobalt oxide totaling to 2 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm.

Distribution in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :150° C./hr; programming rate from 650°~950° C.:200° C./hr; programming rate from 950°~1300° C.:150° C./hr; operating voltage and distribution:(3 sigma) 52±6.5 V; process yield:82% (product standard ±10%).

(3) Firing method 2 in the example of the invention

No debinder process performed; programming rate from 0°~650° C. :150° C./hr; programming rate from 650°~950° C.:200° C./hr; programming rate from 950°~1300° C.:150° C./hr; maintained at 960° C. for 1 hour; operating voltage and distribution:(3 sigma) 50±6.5 V; process yield:85% (product standard ±10%).

(4) Firing method 3 in the example of the invention

Debinder process performed; programming rate from 0°~650° C. 150° C./hr; maintained at 450° C. for 1 hour; programming rate from 650°~950° C.:200° C./hr; programming rate from 950°~1300° C.:150° C. /hr; operating voltage and distribution:(3 sigma) 48±4.6 V; process yield:95% (product standard ±10%).

(5) Firing method 4 in the example of the invention

Debinder process performed; programming rate from 0°~650° C.: 150° C./hr; maintained at 450° C. for 1 hour; programming rate from 650°~950° C.:200° C./hr; programming rate from 950°~1300° C.:150° C. /hr; maintained at 960° C. for 1 hour; operating voltage and distribution:(3 sigma) 47±4.3 V; process yield:98% (product standard ±10%).

(6) Firing method 5 in the example of the invention

Debinder process performed; programming rate from 0°~650° C.: 150° C./hr; maintained at 350° C. for 1 hour; programming rate from 650°~950° C.:200° C./hr; programming rate from 950°~1300° C.:150° C. /hr; operating voltage and distribution:(3 sigma) 49±4.5 V; process yield:99% (product standard ±10%).

(7) Firing method 6 in the example of the invention

Debinder process performed; programming rate from 0°~650° C.: 150° C./hr; maintained at 640° C. for 1 hour; programming rate from 650°~950° C.:200° C./hr; programming rate from 950°~1300° C.:150° C. /hr; maintained at 1025° C. for 1 hour; operating voltage and distribution:(3 sigma) 50±4.5 V; process yield:99% (product standard ±10%).

EXAMPLE 9

First, the following oxides were mixed:zinc oxide at 96 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; and nickel oxide and cobalt oxide totaling to 2 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Gaps in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :200° C./hr; programming rate from 650°~950° C.:200° C./hr; programming rate from 950°~1300° C.:150° C./hr; operating voltage and distribution:(3 sigma) 52±8.0 V; process yield:64% (product standard ±10%); large amount of leakage current, occurrence of blistering in the product, frequent occurrence of cracking and breaking in the subsequent process.

(3) Firing method 2 in the example of the invention

No debinder process performed; programming rate from 0°~650° C. :200° C./hr; programming rate from 650°~950° C.:200° C./hr; programming rate from 950°~1300° C.:150° C./hr; maintained at 1100° C. for 1 hour; operating voltage and distribution:(3 sigma) 50±7.6 V; process yield:72% (product standard ±10%); large amount of leakage current, occurrence of blistering in the product, frequent occurrence of cracking and breaking in the subsequent process.

(4) Firing method 3 in the example of the invention

Debinder process performed; programming rate from 0°~650° C.: 200° C./hr; maintained at 450° C. for 1 hour; programming rate from 650°~950° C.:200° C./hr; programming rate from 950°~130° C.:150° C. /hr; operating voltage and distribution:(3 sigma) 51±6.2 V; process yield:78% (product standard ±10%); large amount of leakage current, occurrence of blistering in the product, frequent occurrence of cracking and breaking in the subsequent process.

(5) Firing method 4 in the example of the invention

Debinder process performed; programming rate from 0°~650° C.: 200° C./hr; maintained at 450° C. for 1 hour; programming rate from 650°~950° C.:200° C./hr; programming rate from 950°~1300° C.:150° C. /hr; maintained at 1100° C. for 1 hour; operating voltage and distribution:(3 sigma) 50±6.0 V; process yield:80% (product standard ±10%); large amount of leakage current, occurrence of blistering in the product, frequent occurrence of cracking and breaking in the subsequent process.

EXAMPLE 10

First, the following oxides were mixed:zinc oxide at 96 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; and nickel oxide and cobalt oxide totaling to 2 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :100° C./hr; programming rate from 650°~950° C.:300° C./hr; programming rate from 950°~1300° C.:150° C./hr; operating voltage and distribution:(3 sigma) 46±5.3 V; process yield:90% (product standard ±10%); no change in process yield of 90% observed after maintaining the temperature at 975° C. for 5 hours.

(3) Firing method 2 in the example of the invention

No debinder process performed; programming rate from 0°~650° C. :100° C./hr; programming rate from 650°~950° C.:300° C./hr; programming rate from 950°~1300° C.:150° C./hr; maintained at 1200° C. for 2 hours; operating voltage and distribution:(3 sigma) 45±5.1 V; process yield:93% (product standard ±10%).

(4) Firing method 3 in the example of the invention

Debinder process performed; programming rate from 0°~650° C.: 100° C./hr; maintained at 640° C. for 1 hour; programming rate from 650°~950° C.:300° C./hr; programming rate from 950°~1300° C.:150° C. /hr; operating voltage and distribution:(3 sigma) 45±3.1 V; process yield:100% (product standard ±10%).

(5) Firing method 4 in the example of the invention

Debinder process performed; programming rate from 0°~650° C.: 100° C./hr; maintained at 640° C. for 1 hour; programming rate from 650°~950° C.:300° C./hr; programming rate from 950°~1300° C.:150° C. /hr; maintained at 1200° C. for 2 hours; operating voltage and distribution:(3 sigma) 41±2.7 V; process yield:100% (product standard ±10%).

EXAMPLE 11

First, the following oxides were mixed:zinc oxide at 95 mol%, oxide which mainly forms a solid solution of zinc oxide spinel, other than titanium oxide and manganese oxide, at 0.5 mol%, titanium oxide, bismuth oxide, and manganese oxide totaling to 3.5 mol%; and nickel oxide and cobalt oxide totaling to 1 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~1300° C.; programming rate:100° C./hr; operating voltage and distribution:(3 sigma) 60±12 V (voltage of 1 mA running in a varistor); process yield:50% (product standard ±10%).

(2) Firing method 1 in the example of the invention

No debinder process performed; programming rate from 0°~650° C. :100° C./hr; programming rate from 650°~950° C.:500° C./hr; programming rate from 950°~1300° C.:150° C./hr; operating voltage and distribution:(3 sigma) 45±5.6 V; process yield:90% (product standard ±10%).

(3) Firing method 2 in the example of the invention

No debinder process performed; programming rate from 0°~650° C. :100° C./hr; programming rate from 650°~950° C.:500° C./hr; programming rate from 950°~1300° C.:150° C./hr; maintained at 1150° C. for 1 hour; operating voltage and distribution:(3 sigma) 44±5.0 V; process yield:92% (product standard ±10%).

(4) Firing method 3 in the example of the invention

Debinder process performed; programming rate from 0°~650° C.: 100° C./hr; maintained at 600° C. for 1 hour; programming rate from 650°~950° C.:500° C./hr; programming rate from 950°~1300° C.:150° C. /hr; operating voltage and distribution:(3 sigma) 43±3.2 V; process yield:100% (product standard ±10%).

(5) Firing method 4 in the example of the invention

Debinder process performed; programming rate from 0°~650° C.: 100° C./hr; maintained at 600° C. for 1 hour; programming rate from 650°~950° C.:500° C./hr; programming rate from 950°~1300° C.:150° C. /hr; maintained at 1150° C. for 5 hours; operating voltage and distribution:(3 sigma) 41±2.8 V; process yield:100% (product standard ±10%).

(6) Firing method 5 in the example of the invention

Debinder process performed; programming rate from 0°~650° C.: 100° C./hr; maintained at 600° C. for 1 hour; programming rate from 650°~950° C.:500° C./hr; programming rate from 950°~1300° C.:150° C. /hr; maintained at 1150° C. for 100 hours; operating voltage and distribution:(3 sigma) 39±3.2 V; process yield:95% (product standard ±10%).

(7) Firing method 6 in the example of the invention

Debinder process performed; programming rate from 0°~650° C.: 100° C./hr; maintained at 600° C. for 1 hour; programming rate from 650°~950° C.:500° C./hr; programming rate from 950°~1300° C.:150° C. /hr; maintained at 1150° C. for 2 minutes; operating voltage and distribution:(3 sigma) 42±3.0 V; process yield:100% (product standard ±10%).

Effects were not confirmed when the time maintained in the range of 1025°~1200° C. was shorter than 2 minutes and longer than 100 hours.

When the programming rate was 500° C./hr and higher, the damage done to the products was so great that this method could not be considered as an industrial production method.

EXAMPLE 12

First, the following oxides were mixed:zinc oxide at 93.5 mol%, oxide which mainly forms a solid solution of zinc oxide spinel, other than titanium oxide and manganese oxide, at 0.5 mol%, titanium oxide, bismuth oxide, and manganese oxide totaling to 1.5 mol%; and nickel oxide and cobalt oxide totaling to 2 mol%. Next, aluminum nitrate was added at 10 ppm mol%, and then mixed in a ball mill for 20 hours and dried. Then, polyvinyl alcohol was added. The disk pressed was fired at 1300° C. for 2 hours, thereby attaining a thickness of 1 mm. Distribution in operating voltage were as follows:

(1) Conventional firing method

Firing temperature:0°~300° C.; programming rate:100° C./hr; operating voltage and distribution:(3 sigma) 57±11 V (voltage of 1 mA running in a varistor); process yield:50% (product standard ±10%).

(2) Firing method 1 in the example of the invention

No debinder process performed; programming rate from 0°~650° C. :100° C./hr; programming rate from 650°~950° C.:175° C./hr; programming rate from 950°~1300° C.:100° C./hr; operating voltage and distribution:(3 sigma) 51±5.8 V; process yield:92% (product standard ±10%).

(3) Firing method 2 in the example of the invention

No debinder process performed; programming rate from 0°~650° C. :100° C./hr; programming rate from 650°~950° C.:175° C./hr; programming rate from 950°~1300° C.:100° C./hr; maintained at 1100° C. for 1 hour; operating voltage and distribution:(3 sigma) 49±5.5 V; process yield:95% (product standard ±10%).

(4) Firing method 3 in the example of the invention

Debinder process performed; programming rate from 0°~650° C.: 100° C./hr; maintained at 450° C. for 1 hour; programming rate from 650°~950° C.:175° C./hr; programming rate from 950°~1300° C.:100° C. /hr; operating voltage and distribution:(3 sigma) 47±3.9 V; process yield:99% (product standard ±10%).

(5) Firing method 4 in the example of the invention

Debinder process performed; programming rate from 0°~650° C.: 100° C./hr; maintained at 450° C. for 30 minutes; programming rate from 650°~950° C.:175° C./hr; programming rate from 950°~1300° C.: 100° C./hr; maintained at 1100° C. for 1 hour; operating voltage and distribution:(3 sigma) 46±6.0 V; process yield:89% (product standard ±10%); The debinder process can be judged as being performed for too short a time.

(6) Firing method 5 in the example of the invention

Debinder process performed; programming rate from 0°~650° C.: 100° C./hr; maintained at 350° C. for 10 hours; programming rate from 650°~950° C.:175° C./hr; programming rate from 950°~1300° C.:100° C. /hr; operating voltage and distribution:(3 sigma) 48±4.1 V; process yield:99% (product standard ±10%).

(7) Firing method 6 in the example of the invention

Debinder process performed; programming rate from 0°~650° C.: 100° C./hr; maintained at 250° C. for 1 hour; programming rate from 650°~950° C.:175° C./hr; programming rate from 950°~1300° C.:100° C. /hr; operating voltage and distribution:(3 sigma) 48±4.8 V; process yield:92% (product standard ±10%).

Debinder effects were not confirmed when the temperature of the debinder process was 350° C. or lower. Therefore, the preferable debinder conditions comprise maintaining the temperature in the range of 350°~650° C. for more than 30 minutes.

Data obtained in the above-mentioned examples and comparative examples are shown in FIG. 2. In FIG. 2, the point at 100° C. indicates Example 1-(1) (conventional example); the point at 150° C. indicates Example 4-(4); the point at 175° C. indicates Example 12-(4); the point at 200° C. indicates Example 8-(4); the point at 300° C. indicates Example 10-(4); and the point at 500° C. indicates Example 11-(4). As clearly shown in FIG. 2, it was confirmed that the sintered products manufactured by the methods of the invention showed only small distribution in operating voltage.

As mentioned above, according to the examples of the invention, various additives which are used in a zinc oxide varistor for improvement of reliability mainly form a solid solution of zinc oxide spinel at a relatively low temperature of 650°~950° C. during the firing process. Therefore, when the programming rate is reduced in this temperature range, a large amount of these compounds will be present. These compounds exist in the particle field and interfere with the particle growth around the temperature in which particles grow to form secondary recrystallization. When these compounds are present in excess, localization will take place, which causes the particles to grow ununiformly. Thus, by enhancing the programming rate in the temperature range of 650° to 950° C., the distribution in particle size can be reduced considerably. Similarly, by performing a debinder process to carbon which has negative effects, the size of particles became even more uniform. A further improvement can be attained by maintaining the temperature range of particle growth of 1025°~1200° C. for many hours. As a result, it is possible to manufacture a zinc oxide varistor with particles which are relatively large and uniformly formed. In addition, in the process of firing the zinc oxide sintered compact body, the solid solution of zinc oxide spinel solid solution mainly control the growth of particles. Since a small amount is formed in the primary phase temperature of the solid solution of zinc oxide spinel ranging from 650°~950° C., the number is controlled by enhancing the programming rate. At the same time, by performing a debinder process and maintaining the temperature range of 1025°~1200° C. for many hours, the size of zinc oxide crystal is intended to become uniform. As a result, this invention was effective in reducing the distribution of operating voltage to about ⅓, improving the yield from 50% to 100%, and also leading to improvement of distribution in surge characteristics at short wave pulse of 2500A to ⅔.

The invention may be embodied in other forms without departing from the spirit or essential characteristics thereof. The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. A zinc oxide sintered compact body obtained from a method comprising the burning of zinc oxide varistor composition consisting essentially of, as oxide components zinc oxide at 78 mol-% or more, magnesium oxide at 0–20 mol-%, bismuth oxide at 0.1 to 2 mol-%, $TiO_2$ at 0.1 to 2 mol-% and antimony oxide (as $Sb_2O_3$) at 0.01 to 0.5 mol-% at a programming rate of 175° to 500° C./hour in the temperature range of from 650° to 950° C. to form a primary phase of a solid solution of zinc oxide spinel, and subsequently at the programming rate of 30° to 500° C./hour in the range of from 950° to 1300° C., wherein said sintered compact body is operable at a short wave pulse of 2500A.

2. The zinc oxide sintered compact body of claim 1, wherein the zinc oxide varistor composition is provided with cobalt oxide as (CoO) at 0 to 3 mol-%, nickel oxide at 0 to 3 mol-%, manganese oxide as MnO at 0 to 3 mol-%, manganese oxide at 0 to 20 mol-%, chromium oxide (as $Cr_2O_3$) at 0 to 0.5 mol-%, tin oxide (as $SnO_2$) at 0 to 0.5 mol-% and at least one substance containing aluminum or gallium which forms an oxide during the firing process at 0 to 50 ppm, for forming a solid solution of zinc oxide spinel essentially having the formula $$Zn_{3-x}(Sb, Ti, Sn, Cr, Mn)_xO_4.$$

3. The sintered zinc oxide compact body of claim 1, wherein the firing temperature in the range from 1025° to 1200° C. is maintained for a period in the range of from 2 minutes to 100 hours.

4. The sintered zinc oxide compact body of claim 1, wherein a binder is added to the composition in an amount of 2 to 10 wt-% and the composition is press-molded prior to burning.

5. The sintered zinc oxide compact body of claim 1, wherein a binder is added to the composition in an amount of 10 to 50 wt-% and the composition is formed into a thin film by a dicoater method or a doctor blade method prior to burning.

6. The sintered zinc oxide compact body of claim 5, wherein the thin film is formed into a laminated chip for the burning process.

7. The zinc oxide sintered compact body of claim 4, wherein a debinder process is preformed in an oxygen-containing atmosphere at 350° to 650° C. prior to performing the burning in the primary phase temperature range.

8. The zinc oxide sintered compact body of claim 2, wherein the zinc oxide varistor composition includes at least two selected from the group consisting of cobalt oxide, manganese oxide and nickel oxide.

* * * * *